US008608126B2

(12) United States Patent
Ng et al.

(10) Patent No.: US 8,608,126 B2
(45) Date of Patent: Dec. 17, 2013

(54) VIBRATION ISOLATION BRACKETS FOR ROLLER BLINDS

(76) Inventors: Philip Ng, Thornhill (CA); Norman Wills, Mississauga (CA)

( * ) Notice: Subject to any disclaimer, the term of this patent is extended or adjusted under 35 U.S.C. 154(b) by 21 days.

(21) Appl. No.: 13/041,700

(22) Filed: Mar. 7, 2011

(65) Prior Publication Data

US 2012/0228464 A1 Sep. 13, 2012

(51) Int. Cl.
*F16M 13/00* (2006.01)

(52) U.S. Cl.
USPC .... 248/636; 248/267; 248/220.22; 160/323.1

(58) Field of Classification Search
USPC .............. 160/323.1, 903, 324, 325, 326, 321, 160/291, 307; 248/363, 262, 265, 267, 269, 248/220.22, 315, 222.11, 127.5, 222.41, 248/266, 268, 636; 403/349, 97, 348; 192/223.4, 223; 74/405, 411.5
See application file for complete search history.

(56) References Cited

U.S. PATENT DOCUMENTS 1,476,160 A * 12/1923 Kirsch .......................... 248/267
4,323,105 A * 4/1982 Berman et al. ................ 160/309
5,137,073 A * 8/1992 Huang .......................... 160/321
5,586,631 A * 12/1996 Benthin ..................... 192/223.2
6,497,627 B2 * 12/2002 Collins ......................... 473/264
6,527,037 B2 * 3/2003 Daus et al. .................... 160/315
6,729,373 B2 * 5/2004 Yukawa et al. ............... 152/450
6,817,402 B1 * 11/2004 Fraczek et al. ............. 160/323.1
6,896,027 B2 * 5/2005 Crouch ......................... 160/315
6,935,401 B2 * 8/2005 Fraczek et al. ................ 160/321
7,128,126 B2 * 10/2006 Smith et al. ................... 160/319
7,380,582 B1 * 6/2008 Anderson et al. .......... 160/323.1
7,740,047 B2 * 6/2010 Koop et al. ................ 160/323.1
8,136,569 B2 * 3/2012 Bohlen et al. ............. 160/323.1
8,281,845 B2 * 10/2012 Seidel .......................... 160/315
8,382,050 B2 * 2/2013 Koop ....................... 248/220.22
2007/0158037 A1 * 7/2007 Bohlen ...................... 160/323.1
2008/0121353 A1 * 5/2008 Detmer et al. ................ 160/266
2008/0202709 A1 * 8/2008 Anderson et al. ............. 160/321
2009/0152422 A1 * 6/2009 Ng et al. ....................... 248/265
2010/0219306 A1 * 9/2010 Detmer et al. ................ 248/201
2011/0139381 A1 * 6/2011 Daniels ......................... 160/298
2011/0265958 A1 * 11/2011 Skinner et al. ................ 160/127

* cited by examiner

*Primary Examiner* — Terrell McKinnon
*Assistant Examiner* — Monica Millner
(74) *Attorney, Agent, or Firm* — Elias Borges

(57) ABSTRACT

There is disclosed a support for mounting an end of a roller blind to a structure such as a wall, ceiling and window frame. The support includes a first plate for mounting to the end of the roller blind and a second plate adjacent the first plate. The second plate has a central aperture dimensioned to receive the end of the roller blind. The support further includes a bracket for mounting the second plate to the structure. A plurality of vibration absorbing fasteners are provided for mounting the first plate to the second plate and dampening vibrations travelling from the first plate to the second plate.

4 Claims, 4 Drawing Sheets

VIBRATION ISOLATION BRACKETS FOR ROLLER BLINDS

FIELD OF THE INVENTION

The invention relates generally to support brackets for supporting roller blinds.

BACKGROUND OF THE INVENTION

Roller blinds generally include an elongated roller tube upon which a section of fabric blind (or shade) is wound. The fabric blind is raised or lowered by rotating the roller tube about its axis, thereby unwinding or rewinding the fabric blind. A control mechanism (or clutch mechanism) is used to control the rotation of the roller tube. The control mechanism may consist of a hand operated pull chain, but increasingly, motorized control mechanisms are used to drive the control mechanism. The entire apparatus, roller tube, control mechanism, electric motor and fabric blind is mounted adjacent the top of a window by means of two or more support brackets. These support brackets generally consist of a stamped steel bracket which has a plurality of apertures and other structures for mounting the brackets to the window frame (or wall as the case may be). Generally, there will be two support brackets for each roller blind, with one support bracket supporting the end of the blind having the control mechanism and a second bracket supporting the opposite end of the blind (usually referred to as the idle end of the blind). The idle end generally consists of a plug like member which supports the roller tube end opposite the control mechanism. The idle end may be configured such that it rotates as the roller tube rotates. Generally, these support brackets must be mounted directly to the control mechanism and the idle end to ensure proper operation of the blind.

While this combination of support brackets, control mechanisms and idle ends have been used quite successfully for several decades, there is one problem generally associated with this combination. Vibration created in the blind, by either the control mechanism or the idle end, will be transmitted through the support brackets and to the wall, ceiling or window frame mounted to the support brackets. While this is often of little concern in hand operated roller blinds, electric powered roller blinds can generate annoying vibrations which translate into unpleasant noise when the blind is operated. In order to minimize the problem, the electric motors and control mechanisms used should be of high quality and precision manufacture in order to reduce vibration. An improved arrangement which overcomes the problems associated with vibration created by electric blind motors is therefore desirable.

SUMMARY OF THE INVENTION

In accordance with one aspect of the present invention, there is provided a support for mounting an end of a roller blind to a structure such as a wall, ceiling and window frame. The support includes a first plate for mounting to the end of the roller blind and a second plate adjacent the first plate. The second plate has a central aperture dimensioned to receive the end of the roller blind. The support further includes a bracket for mounting the second plate to the structure. A plurality of vibration absorbing fasteners are provided for mounting the first plate to the second plate and dampening vibrations travelling from the first plate to the second plate.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention.

DESCRIPTION OF THE DRAWINGS

In the drawings like characters of reference indicate corresponding parts in the different figures.

DETAILED DESCRIPTION OF THE INVENTION

Figure 1:
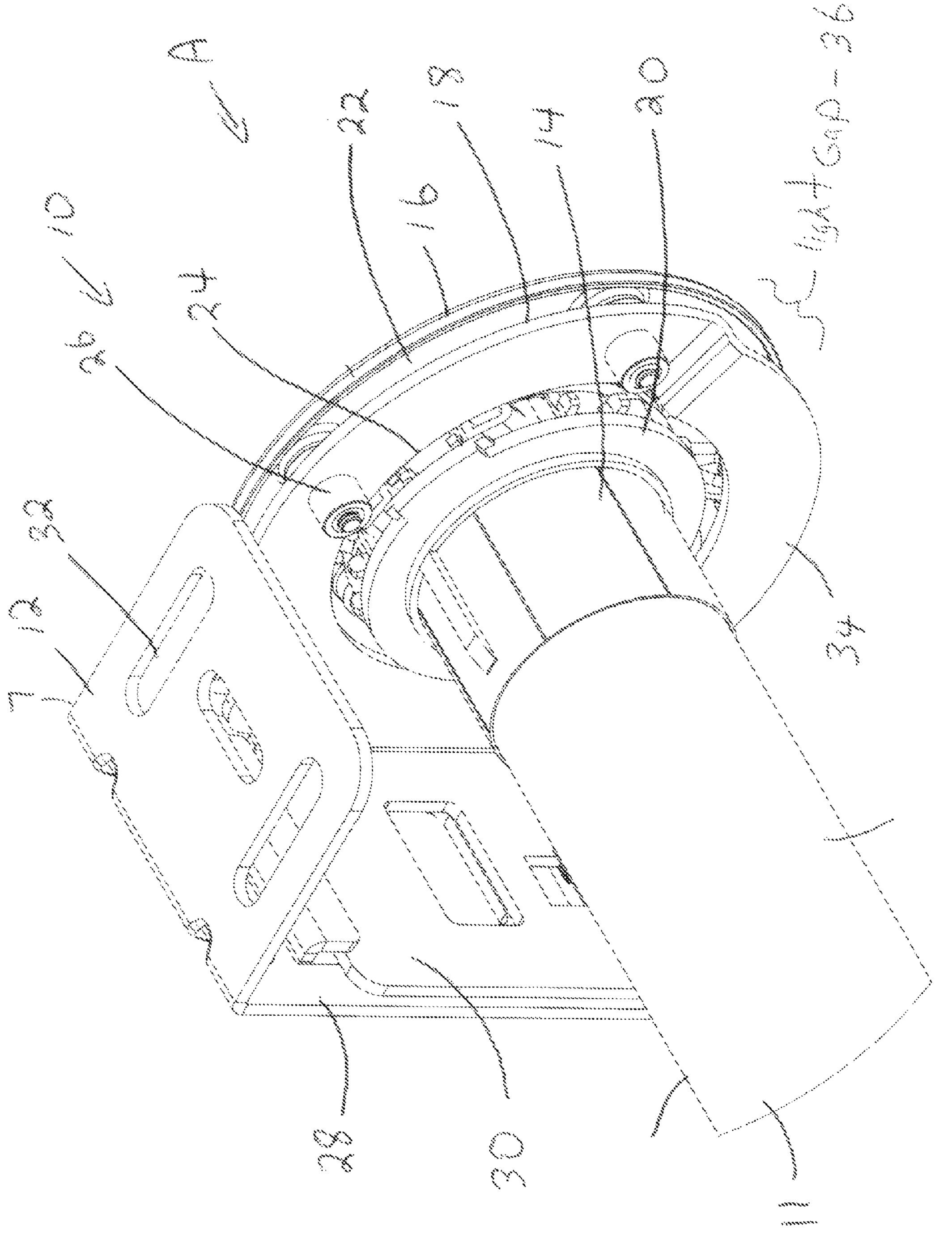
FIG. 1 is a perspective view of a support for mounting an end of a roller blind made in accordance with the present invention showing a roller blind mounted to the support.
Figure 4:
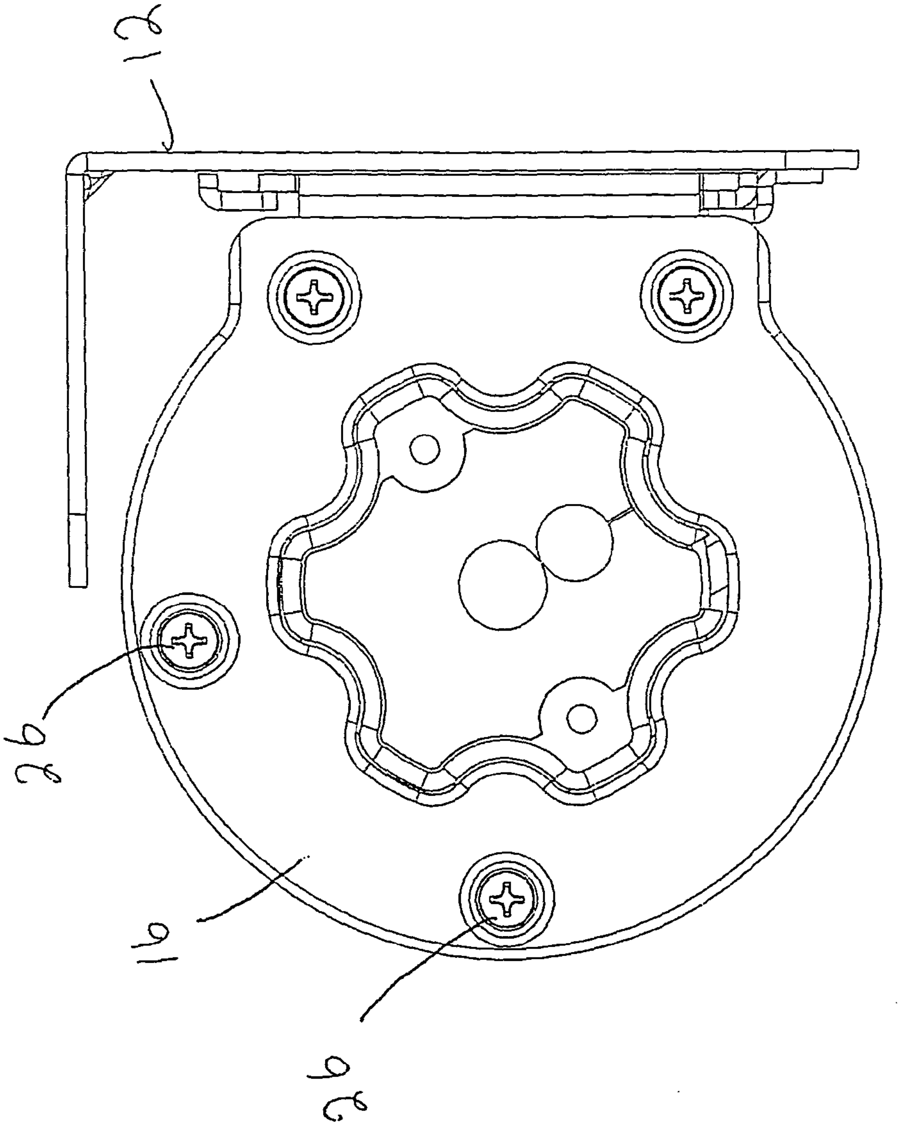
FIG. 4 is a side view of the support shown in FIG. 1 taken from view A.

Referring to FIG. 1, a support made in accordance with the present invention is shown generally as item 10 and includes mounting bracket 12, first plate 16, and second plate 18. Roller blind 9 includes an electric motor drive 11 which is coupled to roller control mechanism 14. Control mechanism 14 is coupled to the roller tube (not shown) by fitting the control mechanism within one end of the roller tube. Control mechanism 14 has a sprocket portion 20 which can be used with a roller chain (not shown) for operating the control mechanism without the electric drive motor. Control mechanism 14 passes through aperture 24 in second plate 18 and is mounted directly to first plate 16. Plates 16 and 18 are parallel to each other and separated by gap 22. The first and second plates are connected to each other by vibration dampening fasteners 26. Second plate 18 has a transverse tongue 30 extending perpendicularly from the rest of the plate. Tongue 30 is mounted to back wall 28 of bracket 12. As best seen in FIG. 4, vibration dampening fasteners 26 are positioned around the outside of plate 16.

Figure 2:
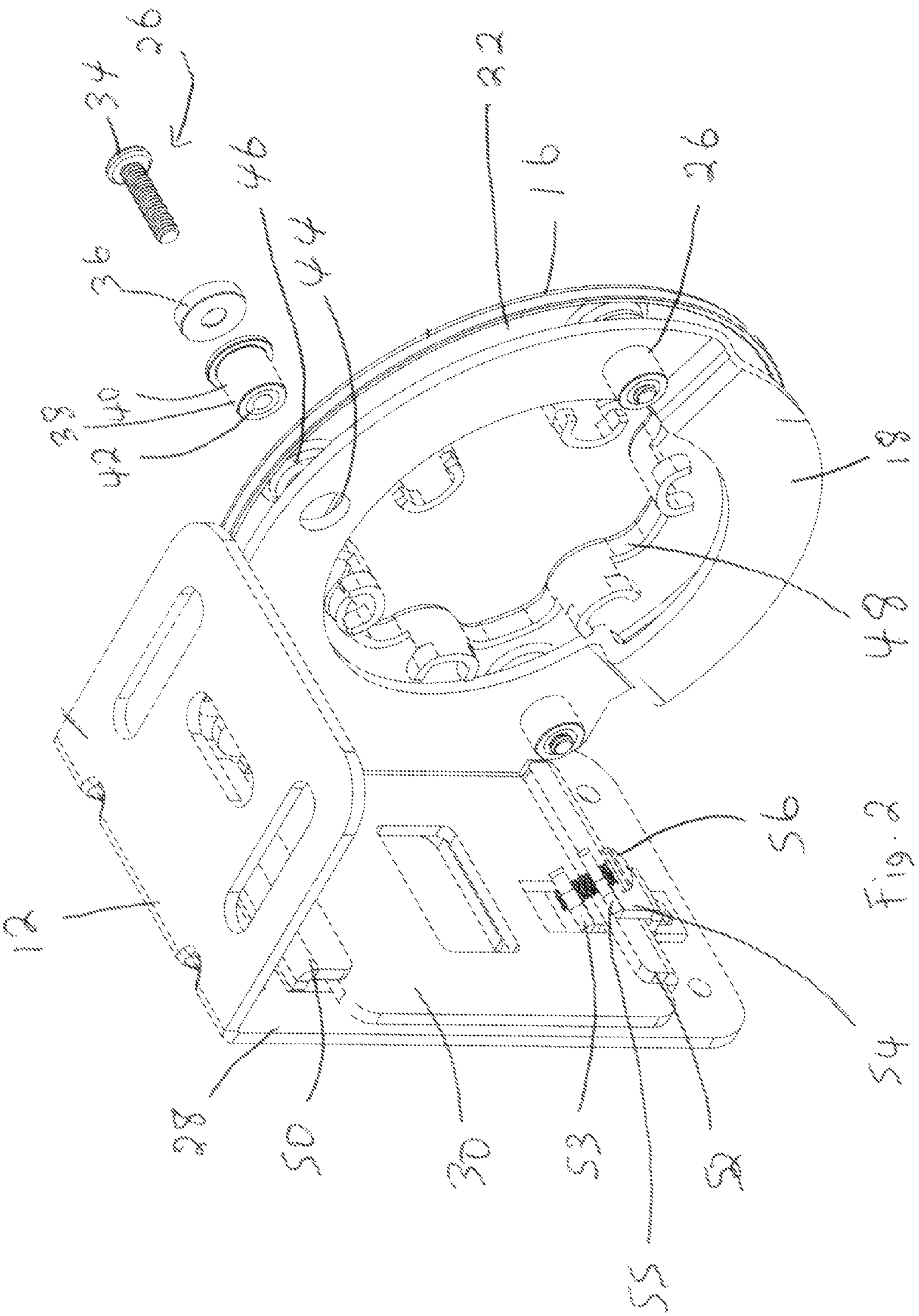
FIG. 2 is a perspective view of the support shown in FIG. 1 without the roller blind.

Referring now to FIG. 2, each vibration absorbing fastener 26 consists of a screw bolt portion 34 and two vibration dampeners 36 and 38. Vibration dampener 36 consists of a washer or gasket made of a highly vibration dampening material, such as rubber (either natural or artificial). Vibration dampener 38 consists of a cylindrical barrel 40 made of a vibration dampening material surrounding a threaded metal core 42. Cylindrical barrel 40 has different vibration dampening characteristics from vibration dampener 36. While both are made of vibration dampening material such as rubber, barrel 40 is generally harder than vibration dampener 36 since it must bear more weight. Barrel 40 fits snuggly within apertures 44 of second plate 18 while vibration dampener 36 is sandwiched between plates 16 and 18 to ensure that the two plates are always separated by gap 22 and never touch one another. Threaded metal core 42 is configured to mate with screw bolt 34. When mounted to plates 16 and 18, screw bolt 34 and vibration dampers 36 and 38 are all coaxially aligned. Metal core 42 is separated from plate 18 by barrel 40 which acts to dampen any vibration travelling between the screw bolt and plate 18. Plate 16 therefore floats on plate 18.

Plate 16 is provided with a plurality of mounting elements 48 for mounting the plate to the control mechanism 14 (see FIG. 1). As best seen in FIG. 1, aperture 24 of plate 18 is sufficiently wide such that no portion of the plate contacts control mechanism 14. Plate 16 is mounted to the very terminal end of the roller blind (i.e. the very end of control mechanism 14, while plate 18 physically mounts the roller blind to support bracket 12. By having the roller blind pass though the plate which is actually mounted to the support bracket, the light gap 36 (namely the distance separating edge 7 of bracket 12 and the very end of control mechanism 14) is minimized. The light gap is effectively the gap separating the edge of the fabric blind (not shown) and the window frame (not shown), so the narrower the light gap, the more attractive the final installation.

Referring back to FIG. 2, tongue 30 is mounted to back wall 28 of support bracket 12 by means of grooves 50 and 52 formed on the back wall. Tongue 30 is slid in between grooves 50 and 52 and locked into place by lock mechanism 54. Lock mechanism 54 consists of lock element 53 formed on tongue 30 and lock element 55 formed on back wall 28. Lock elements 53 and 55 have threaded apertures which align when the lock elements are moved adjacent one another. Bolt 56 can then be threaded through the aligned lock elements to lock tongue 30 to back wall 28 and hence lock plate 18 to support bracket 12. Support bracket 12 has a plurality of apertures 32 to facilitate the mounting of the support bracket to a wall, ceiling or window frame.

Referring back to FIG. 1, any vibrations created by motor 11 or control mechanism 14 cannot pass to plate 18 without first passing through vibration dampening fasteners 26. Since fasteners 26 are made of two vibration dampening elements, the energy contained in the vibrations generated by motor 11 or control mechanism 14 is largely absorbed by fasteners 26 and are not passed to support bracket 12. Hence, the net effect is a blind which operates with less noise and vibration.

Figure 3:
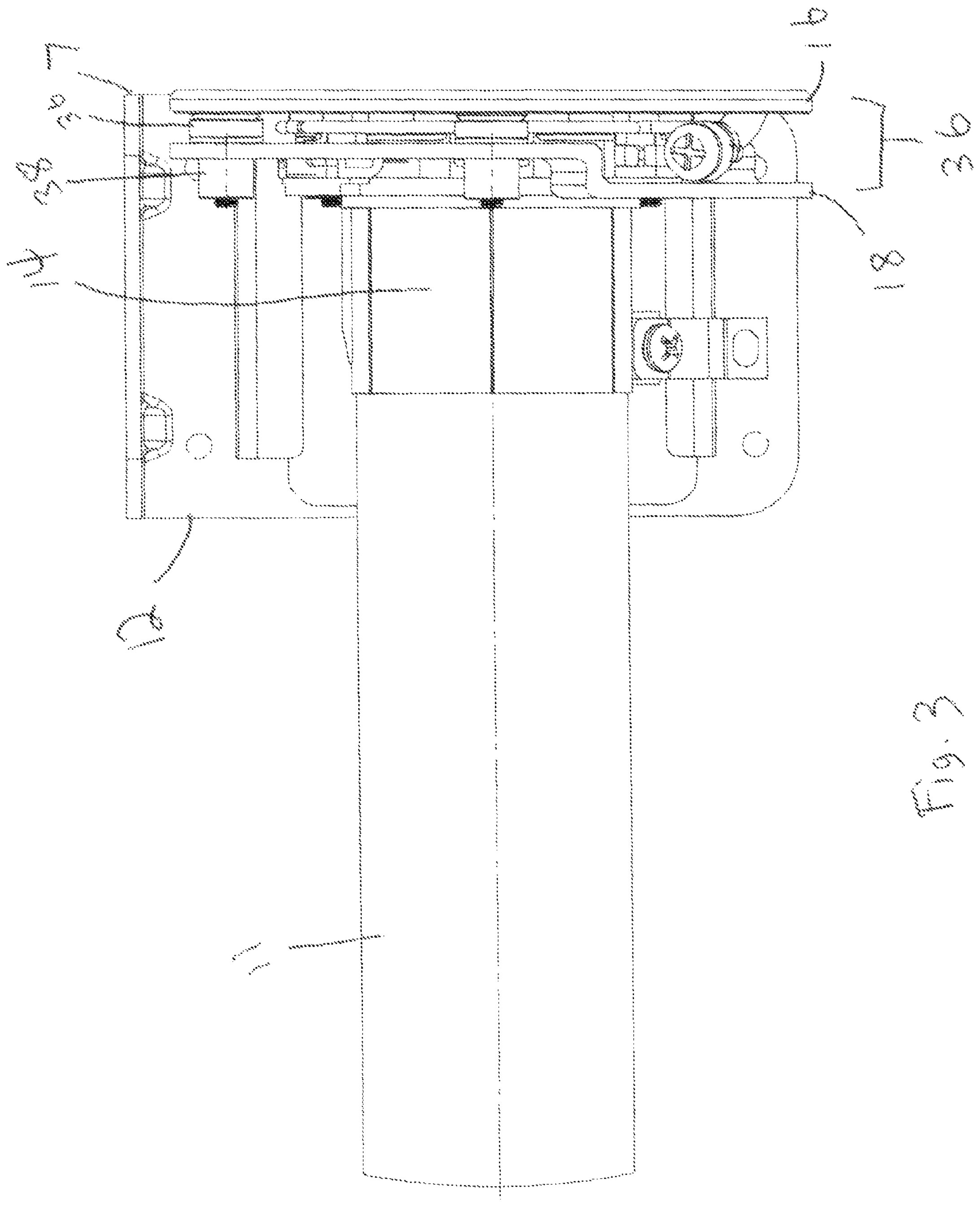
FIG. 3 is a front view of the support shown in FIG. 1.

Referring to FIG. 3, the light gap 36 which exists between the end of control mechanism 14 and edge 7 of bracket 12 is minimized in the current design. The vibration isolation of roller tube 11 and control mechanism 14 from support bracket 12 requires two separate plates, namely plates 16 and 18, which are connected to each other by vibration dampeners 38 and 36. If the control mechanism 14 was mounted to bracket 18, then the distance separating the control mechanism and edge 7 of bracket 12 would be increased, thereby increasing the size of light gap 36. However, since control mechanism 14 passes through plate 18 before mounting directly to plate 16, the control mechanism can be brought as close as possible to edge 7 of bracket 12 and the light gap 36 is therefore minimized.

A specific embodiment of the present invention has been disclosed; however, several variations of the disclosed embodiment could be envisioned as within the scope of this invention. It is to be understood that the present invention is not limited to the embodiments described above, but encompasses any and all embodiments within the scope of the following claims Therefore, what is claimed is:

1. A support for mounting an end of a roller blind to a structure such as a wall, ceiling and window frame, the support comprising:

a. A first plate for mounting to the end of the roller blind;

b. A second plate adjacent the first plate, the second plate having a central aperture dimensioned to receive the end of the roller blind;

c. A bracket for mounting the second plate to the structure;

d. The first and second plates being parallel and separated by a gap such that the first and second plates do not touch each other, a plurality of vibration absorbing fasteners extending between the gap and positioned between the first and second plates mounting the first plate to the second plate and dampening vibrations travelling from the first plate to the second plate, and the bracket and the first and second plates being configured such that the roller blind is supported by the first plate, the first plate is supported by the second plate and the second plate is supported by the bracket, and e. wherein the end of the roller blind passes through the aperture of the second plate without touching the second plate to mount to the first plate.

2. The support as defined in claim 1 wherein the first and second plates are parallel, and wherein the second plate has a tongue which extends perpendicularly from the second plate, the tongue configured to mount to the bracket.

3. The support as defined in claim 2 wherein the bracket has a groove configured to slidingly receive the tongue.

4. The support as defined in claim 3 further comprising a lock for locking the tongue to the groove of the bracket.

* * * * *